US008125332B2

(12) United States Patent
Curran et al.

(10) Patent No.: US 8,125,332 B2
(45) Date of Patent: Feb. 28, 2012

(54) GEO-FENCE WITH MINIMAL FALSE ALARMS

(75) Inventors: David Curran, West Chester, PA (US); Rand A. Fanshier, Wayne, PA (US); Jesse Demmel, Longmont, CO (US)

(73) Assignee: Zoombak, Inc., Cary, NC (US)

( * ) Notice: Subject to any disclaimer, the term of this patent is extended or adjusted under 35 U.S.C. 154(b) by 465 days.

(21) Appl. No.: 12/276,246

(22) Filed: Nov. 21, 2008

(65) Prior Publication Data

US 2010/0127919 A1    May 27, 2010

(51) Int. Cl.
*G08B 1/08* (2006.01)

(52) U.S. Cl. ............... 340/539.13; 340/572.1; 340/988; 455/456.1; 342/357.22

(58) Field of Classification Search .. 340/539.1–539.13, 340/572.1, 988–996; 342/350, 357.22, 357.25, 342/450–465; 455/456.1, 456.3
See application file for complete search history.

(56) References Cited

U.S. PATENT DOCUMENTS

| | | | |
|---|---|---|---|
| 5,365,451 A | 11/1994 | Wang et al. | |
| 6,172,640 B1 | 1/2001 | Durst et al. | |
| 6,236,358 B1 | 5/2001 | Durst et al. | |
| 6,421,001 B1 | 7/2002 | Durst et al. | |
| 6,441,778 B1 | 8/2002 | Durst et al. | |
| 6,480,147 B2 | 11/2002 | Durst et al. | |
| 6,496,775 B2 * | 12/2002 | McDonald et al. | 701/213 |
| 6,518,919 B1 | 2/2003 | Durst et al. | |
| 6,771,213 B2 | 8/2004 | Durst et al. | |
| 6,839,020 B2 | 1/2005 | Geier et al. | |
| 6,859,171 B2 | 2/2005 | Durst et al. | |
| 6,980,131 B1 * | 12/2005 | Taylor | 340/994 |
| 7,113,126 B2 | 9/2006 | Durst et al. | |
| 7,171,381 B2 | 1/2007 | Ehrman et al. | |
| 7,209,075 B2 | 4/2007 | Durst et al. | |
| 7,327,250 B2 * | 2/2008 | Harvey | 340/539.13 |
| 2004/0039527 A1 * | 2/2004 | McDonald et al. | 701/213 |
| 2004/0239558 A1 * | 12/2004 | Geier et al. | 342/357.06 |
| 2008/0186166 A1 * | 8/2008 | Zhou et al. | 340/539.13 |
| 2009/0170528 A1 * | 7/2009 | Bull et al. | 455/456.2 |

OTHER PUBLICATIONS

PCT Notification of Transmittal of the International Search Report and the Written Opinion of the International Searching Authority mailed Dec. 23, 2009, issued in corresponding International Application No. PCT/US09/62625.

* cited by examiner

*Primary Examiner* — Eric M Blount
(74) *Attorney, Agent, or Firm* — Woodcock Washburn LLP

(57) ABSTRACT

A method and apparatus is disclosed for a wireless device locator system and determining whether a device has entered or exited a two dimensional geographic zone area and alerting the device user when the device has entered or exited the zone. The method and apparatus may further minimize the probability of false zone entry and exit zone area alerts to wireless tracking device users.

22 Claims, 13 Drawing Sheets

*Entering the Geofence*

Center point = 511

| Level | Circle | Radius |
|---|---|---|
| GF | 517 | 512 |
| 0 | 515 | 520 |
| 1 | 516 | 513 |
| 2 | 518 | 514 |
| 3 | 519 | 521 |

GF=Geofence

GF=Geofence
L0 = Level 0
L1 = Level 1
L2 = Level 2
L3 = Level 3

*Exiting the Geofence*

Center point = 501

| Level | Circle | Radius |
|---|---|---|
| GF | 507 | 502 |
| 0 | 505 | 510 |
| 1 | 506 | 503 |
| 2 | 508 | 504 |
| 3 | 509 | 500 |

GF=Geofence

GF=Geofence
L0 = Level 0
L1 = Level 1
L2 = Level 2
L3 = Level 3

GEO-FENCE WITH MINIMAL FALSE ALARMS

TECHNICAL FIELD

The presently disclosed subject matter relates generally to a method and system for locating wireless devices such as those used in analog or digital cellular systems, personal communications systems (PCS), enhanced specialized mobile radios (ESMRs), and other types of wireless communications systems. More particularly, but not exclusively, the present disclosure relates to a method for increasing the probability of detection of movement into or out of a geographically defined area while decreasing the probability of false positives.

BACKGROUND

Since the deployment of the United States Navstar Global Positioning System (GPS) in 1984 and the 2000 Presidential Order disabling Selective Availability for civilian uses, precise location has been available to those equipped with GPS receivers.

The location services marketplace includes individual consumers who want to track their family members, pets, or physical assets; business owners who want to track their employees or physical assets; caretakers of Alzheimer's patients; owners of vehicles at risk of theft; and the like. Any mobile entity capable of carrying a locator device, incorporating the locator device circuitry or having the capability to attach the locator device can be situated inside or outside a geo-fence and the user of the locator device may be notified upon the device's exit or entry of a pre-provisioned 2-dimensional geographic zone area or geo-fence.

A geo-fence is a horizontal boundary on the ground based upon a closed polygon, for example a circular radius around a fixed geographic point or a multi-point polygon encompassing an area-of-interest and/or excluding areas such as roadways or properties. For the simple circle boundary, the Haversine formula is used in calculating the "great circle" distance from the locator to the boundary. The Haversine formula is an equation for calculating the great circle distances between two points on a sphere using their longitudes and latitudes. For the polygon boundary, defined as a set of up to n points, there are an equal number of arc segments. After the segment point closest to the locator is selected, the Haversine formula is applied.

A locator geo-fence consists of a boundary and an attribute to indicate when a notification will be sent—entry, exit, or both. One approach is to make use of the emerging Assisted GPS (AGPS) technology to obtain a highly reliable fast location determination that includes a trustworthy error ellipse (for convenience, of equal major and minor axes). Treating the location as a circular field of radius r rather than just a point, geo-fence factors have been applied to arrive at an acceptable balance of certainty and sensitivity for notifying subscribers that their locator has entered or exited a zone.

Practical experience in the limitations of the GPS solution reveals that an approach conforming to actual GPS behavior works much better than relying on the manufacturer specification sheets. For example, when a GPS chipset supplier specifies its accuracy, it is typically specifying open sky conditions and 95% confidence, meaning that with no obstructions 5% of locations will fall outside that error radius, and no promise of any absolute maximum error. Adding obstructions drops the confidence to 2-sigma (86.5%) or less. Without any means of minimizing false positives, false notifications may occur 13.5% or more of the time.

SUMMARY

In various embodiments, a method and system are disclosed for locating wireless devices and determining whether a device has entered or exited a pre-provisioned 2-dimensional or 3-D dimensional geographic zone and alerting the mobile device user or a network monitor when the mobile device has entered or exited the zone. In an embodiment, the locator system may include a wireless device attached to an object that is to be located. The device may further include a GPS receiver and an internal antenna subsystem, a wireless data transceiver and an internal antenna subsystem, and application software using a false alarm minimization algorithm. The false alarm minimization algorithm minimizes the probability of false zone entry and exit zone area alerts to wireless tracking device users for device entry or exit of a user-provisioned 2-dimensional geographic zone area using position fix error ellipse characteristics, geographic zone area polygon characteristics, and position fix retries.

In addition to the foregoing, other aspects are described herein. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The foregoing summary as well as the following detailed description are better understood when read in conjunction with the appended drawings.

DETAILED DESCRIPTION OF ILLUSTRATIVE EMBODIMENTS

Figure 1:
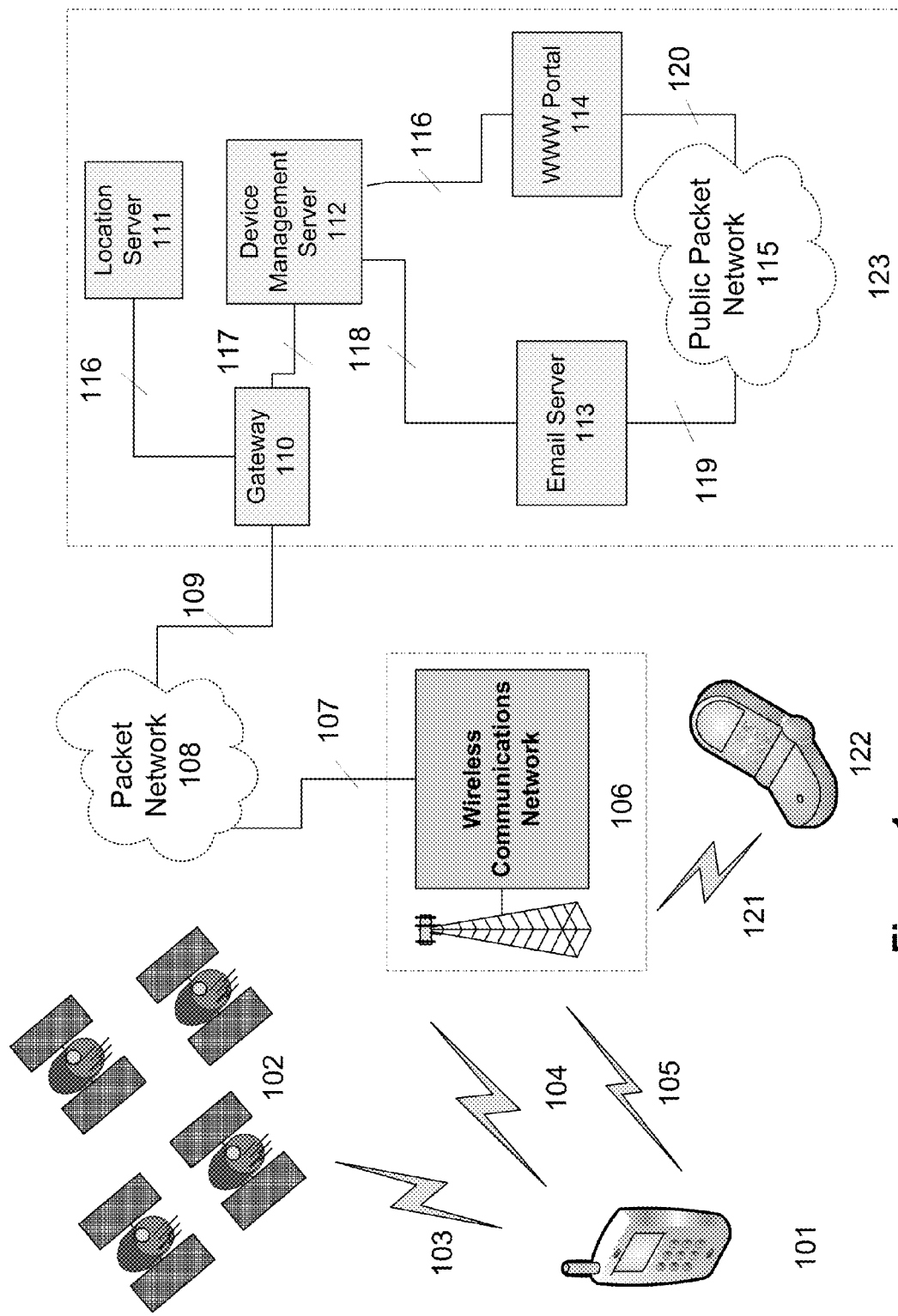
FIG. 1 schematically depicts an exemplary overview of functional network entities enabling an illustrative embodiment of the present disclosure.

The methods and systems disclosed herein apply to generic radio communication networks and generic wireless location systems and techniques. The Global Positioning System (GPS) model discussed herein is an exemplary but not exclusive environment in which the present disclosure may be used Furthermore, the term circuitry used through the disclosure can include specialized hardware components such as graphics processors, and audio codecs for example. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s). Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

While global positioning system coordinates has been used for location and even geo-fencing applications since its inception in 1980, intelligent use and reliance on the GPS position error ellipse may enable vastly smaller geo-fence areas. Whereas typical industry settings for a geo-fence are often in gross increments of a half-mile in order to prevent false notifications, locators using the algorithm as described herein may monitor circular zones 50 meters, or less, in radius. In addition, the device platform services and application/algorithm software scheduling algorithm may allow for optimal power management to maximize battery life. Additionally geo-fences with an altitude component (3-dimensional) become practical.

The present disclosure addresses the empirical observation that GPS typically returns mostly inaccurate positions near the ground by delaying use of the GPS data until the accuracy is sufficient, tuning geo-fence factors based on accuracy and geo-fence size, and introducing a "vote of two" to prevent the wildest GPS jumps from turning into false notifications for the subscriber. Geo-fence factors that may be tuned may comprise location uncertainty, geofence radius, and distance from current location point to geo-fence boundary point.

In an embodiment, a voting mechanism comprising a vote of two may be implemented as follows. If a measured GPS location fix is determined to have crossed the geo-fence boundary, a second GPS location fix is immediately measured and if the second GPS location fix is also determined to have crossed the geo-fence boundary, the probability or confidence that the device has crossed the geo-fence boundary may be considered higher than the probability or confidence using only a single GPS location fix. The algorithm logic may then determine that the device has crossed the geo-fence boundary and an alert may be sent to the user. If the second fix determines that the device has not crossed the geo-fence boundary, then an alert will not be sent to the user and the algorithm may continue to the next step.

Location determination contains an inherent amount of uncertainty. However, geo-fencing requires as much precision as possible in order to prevent false positives and thus a poor user experience. The largest area of risk is when the device is close to or crossing the geo-fence boundary. In order to mitigate that risk, in one embodiment the algorithm includes several configurable parameters that are used to determine the confidence regarding crossing a boundary.

In one embodiment, the confidence threshold is defined as a level of confidence that the device has crossed the geo-fence boundary. This value is a factor expressed in terms of distance from the edge of the geo-fence and reported location uncertainty. Calculation of a level of confidence is by the formula:

$$\text{confidence factor} = \left[ \frac{(\text{distance}(fenceCenterPoint, currentLocation) - fenceRadius)}{locationUncertainty} \right]$$

Where
fenceCenterPoint—The latitude and longitude of the center of the geo-fenced circle or the center-of-mass of the geo-fenced polygon.
currentLocation—The latitude and longitude of the locator device as calculated by the location system used.
fenceRadius—The radius of the geo-fenced circle or the radius from the center-of-mass of the geo-fenced polygon.
locationUncertainty—The returned horizontal uncertainty as calculated by the location system used
Distance (e, f)—Distance as calculated by the Haversine formula As known to those skilled in the art, the Haversine formula is an equation for calculating the great-circle distance between two points on a sphere from their longitudes and latitudes. One expression of the Haversine formula may be given as:

$\Delta lat = lat2 - lat1$ $\Delta long = long2 - long1$ $a = \sin^2(\Delta lat/2) + \cos(lat1)*\cos(lat2)*\sin^2(\Delta long/2)$ $c = 2*a \tan 2(\sqrt{a}, \sqrt{(1-a)})$ $d = R*c$ where R=earth's radius (mean radius=6,371 km)

The calculated confidence factor can be tiered into four distinct levels:

Level 3—The device has crossed the geo-fence (state has changed). No further location determination is required. This level should immediately trigger a state change and if this geo-fence is configured for this type of state change, notify the server of that change. If the prior state (possible values in, out, or unknown) is unknown, store the state so the next polling interval can determine the correct level.

Level 2—Due to the uncertainty in the location returned, the device is in a "gray" area very close to the border of the geo-fence (state change is probable). Further investigation must be performed to determine if the device has definitively entered or exited the zone. It is recommended that immediate consecutive location determination(s) (based on the validation count) occur to increase the confidence factor. If the prior state is unknown, this level is still valid as the current state should be determined before storing the state.

Level 1—The device has not yet crossed the threshold (state has not changed), but is getting close (taking into account the returned uncertainty). No further location determinations need to be performed. However, because regular polling intervals may be far apart, then the interval is shortened (default is ½ the polling interval) while the device remains in this level of confidence percentage. If the prior state is unknown, store the state for the next polling interval.

Level 0—The device is safely within/outside the geo-fence (state has not changed). Continue with regular polling intervals. If the prior state is unknown, store the state for the next polling interval.

FIG. 1 depicts an example network and functional entities in which various embodiments of the present disclosure may be implemented. Referring to FIG. 1, the wireless device 101 is depicted, wherein the device may include a GNSS (Global Navigation Satellite System) receiver configured to receive signals from GNSS satellites 102. An operative example of a GNSS 102 is the United States NavStar Global Positioning System. The GNSS 102 provides radio signaling 103 allowing calculation of highly accurate, three-dimensional location information, precision velocity and timing services by terrestrial receiver units. The wireless device 101 may further communicate with the Location Device Management Network 123 via a wireless communications network 106 that supports wireless data communications 104 and a wired or wireless packet network 108 with dedicated or shared data connections 107 and 109.

The wireless data communications uplink 104 and downlink 105 can be used for the downloading of assistance data from either the wireless communications network 106 or from the location server 111 via the intermediate data links 116, 109, and 107, packet network 108, and gateway 110. Data routing may be dependent on the capabilities of the wireless communications network 106.

The wireless communications network 106 downlink signal 105 may also be used to enable mobile-based location techniques such as cell-ID, Advanced Forward Link Trilateration (AFLT) or Enhanced Cell ID (ECID) where broadcast information, the signal timing and/or power is used to calculate a position estimate.

The wireless location device 101 radio uplink transmissions 105 may be used by network-based wireless location system(s) for localization when the GNSS signals 103 are blocked. The wireless device 101 radio uplink transmissions 105 may also be used as part of a hybrid GNSS position estimate calculation.

The packet network 108 as depicted may be a generic digital packet network with transmission and routing facilities. Depending on the implementation with the wireless operator, the packet network 108 may be either private or public.

The public packet network 115, as depicted, may be a generic digital packet network with transmission and routing facilities. The Internet is the prime example of this type of packet network.

The Location Device Management Network 123 may consist of functional software entities running on generic computer processing platforms. Although shown in this example as residents of a network cluster, the various entities within the Location Device Management Network 123 may reside on one or multiple servers. The internal digital interconnections 116, 117, and 118 within the Location Device Management Network 123 may be implemented as local area connections, wide area connections or as virtual connections within a computing platform. The external digital connections 109, 119, and 120 associated with the Location Device Management Network 123 are assumed by this model as implemented using industry defined packet WAN connections.

The Gateway 110 may be a selective firewall and communications router to protect and insulate the Location Device Management Network 123 from external threats. The Gateway 110, under direction from the Device Management Server 112, may also offer authentication and access control services. The Device Management Server 112 may be the administrative, accounting, and logistical control entity for the Location Device Management Network 123 and wireless location devices 101.

The Email Server 113 and WWW portal 114 are examples of commonly available applications. The Email Server 113 or the WWW portal 114 may be used to communicate with landside (not shown) terminals or mobile terminal 122 when location events such as arrival, departures, border crossings or periodic location verifications occur. The mobile terminal 122 may support a radio link 121 with the wireless communications network 106 which in turn may connect to the Public Packet Network 115.

Figure 2:
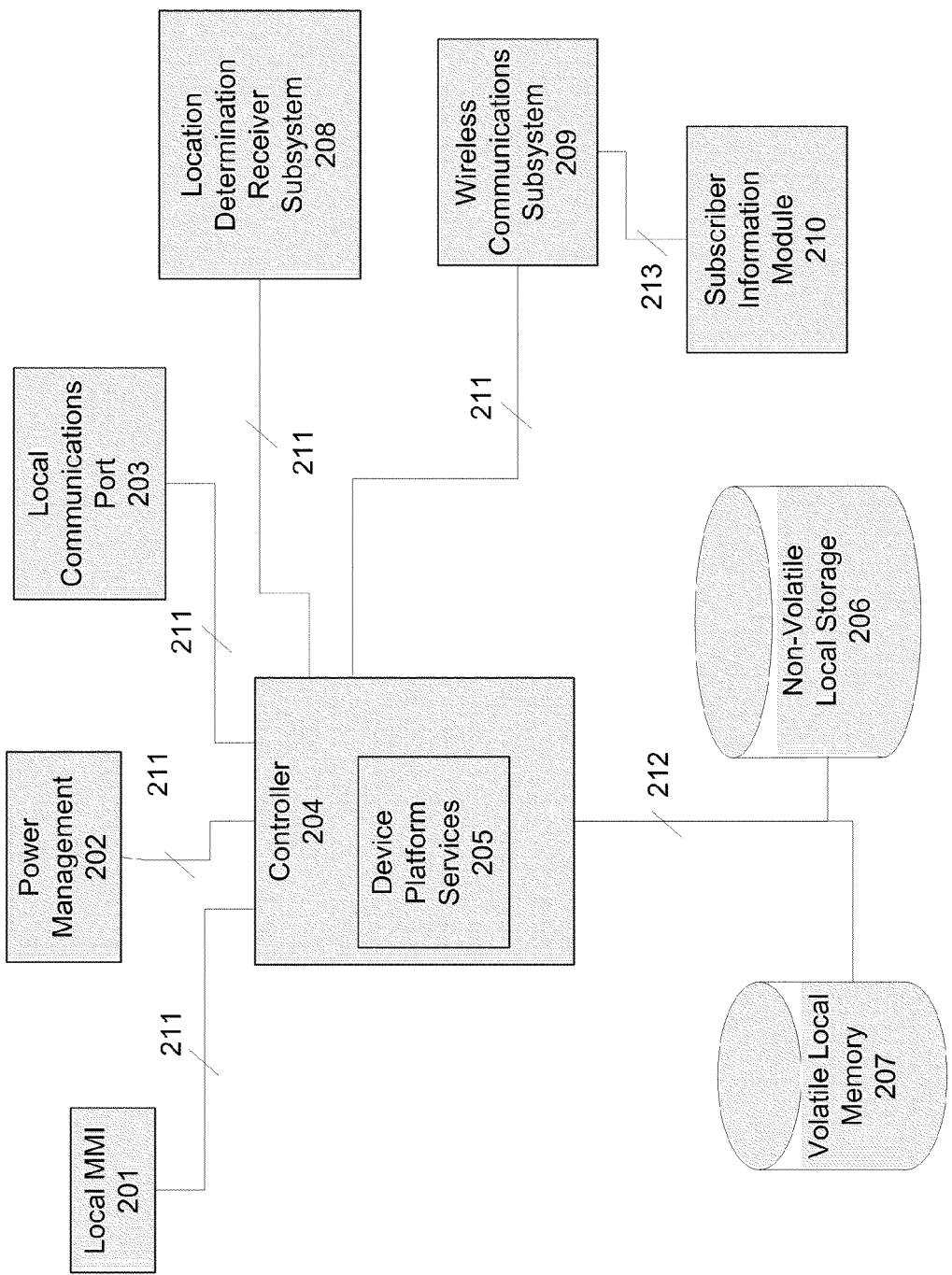
FIG. 2 schematically depicts an exemplary overview of the functional entities as part of the mobile component enabling an illustrative embodiment of the present disclosure.

The wireless location device 101 may be a single purpose device attached to an object that is to be located or incorporated into another wireless device. In either case, and referring to FIG. 2, the wireless location device 101 may include a main CPU module (the controller 204) and a Device Platform Services application 205. A local Man-Machine-Interface (MMI) 201 may be provided for local checks on device status and battery level. A power management subsystem 202, configured by software or circuitry, may provide battery management, recharge facilities, and power level estimates for the local MMI 201 or remotely to the Device Management Server 112. A local communications port 203 may be used for reprogramming of application software or device configuration settings.

Internal data links 211 may provide interconnectivity between the various subsystems of the wireless location device 101. Internal data buses 212 may be used to connect the controller 204 and thus the Device Platform Services application 205 application to the local volatile memory 207 and non-volatile memory storage 206.

The Location Determination Subsystem 208 may include the GNSS receiver and associated antenna.

The Wireless Communications Subsystem 209 may provide interfaces to the radio communications uplink 104 and downlink 105. The Subscriber Information Module 210 (also known as a removable User Information Module (R-UIM) or Universal Subscriber Identity Module (USIM)) is an industry standard module containing subscription information needed to enable the Wireless Communications Systems 209 to access the Wireless Communications Network 106.

If the Location Determination Subsystem 208 is implemented, the Wireless Communications Subsystem 209 and the Controller 204 may be used to implement mobile-based location techniques.

When the Device Platform Services software 205 completes a wireless data session, the application may send a command to the Wireless Communications Subsystem 209 to detach the wireless data connection to the network and transition to a low-power idle mode. When the device application software completes a location fix, the application may send a command to the Location Determination Receiver Subsystem 208 (e.g. the GPS module) to power down the module, thus eliminating power consumption by the Location Determination Receiver Subsystem 208 GPS module until the next location fix is requested by the application. When the device application software completes an application task, the application may send a command to the CPU module 204 to start the wakeup timer and transition the CPU module 204 to low-power sleep mode.

A zone alert schedule may specify the daily time intervals that the device may periodically determine a location (e.g. GPS position) fix and send an alert to a user if the device enters or exits the pre-defined geofence boundary or zone. Referring to FIG. 1, the user, accessing the Device Management Server 112 via the WWW Portal 114, may select a start and end time (e.g., from 7:00 am to 5:30 pm) for either (a) a single day that is recurring every week (e.g., every Monday), (b) selected multiple days of the week (e.g., Monday, Wednesday, Friday, Saturday, Sunday, etc.) that are recurring every week, or (c) all days of the week (i.e., Monday, Tuesday, Wednesday, Thursday, Friday, Saturday, Sunday). The selected start and end time may be configured to recur every week. The recurring schedule may continue until the user reconfigures the schedule or the schedule is terminated due to account termination. The schedule may be implemented by the Device Platform Services 205 and stored in the nonvolatile local storage 206

Referring again to FIG. 1, the network server (the device management server 112) may have the capability to configure the periodic rate (e.g., every 4 hours) at which the device will upload position fix logs to the server via a wireless data connection. Based on the configured rate, the device may set this value to a wakeup timer. When the timer expires, the device may wake up the application, read the position fix log from memory, set up a wireless data connection to the server, and send the position fix log to the server. The server may store the position fix log for each device in a database. The user may select, for example, a position fix history tab for a selected device and time filter via the web server, whereupon the server may read the position fix data from the database for the selected time interval and display the positions to the user via a map display. The map display may, for example, depict position fix points and an arrow connecting each point based on position fix timestamps.

Figure 3:
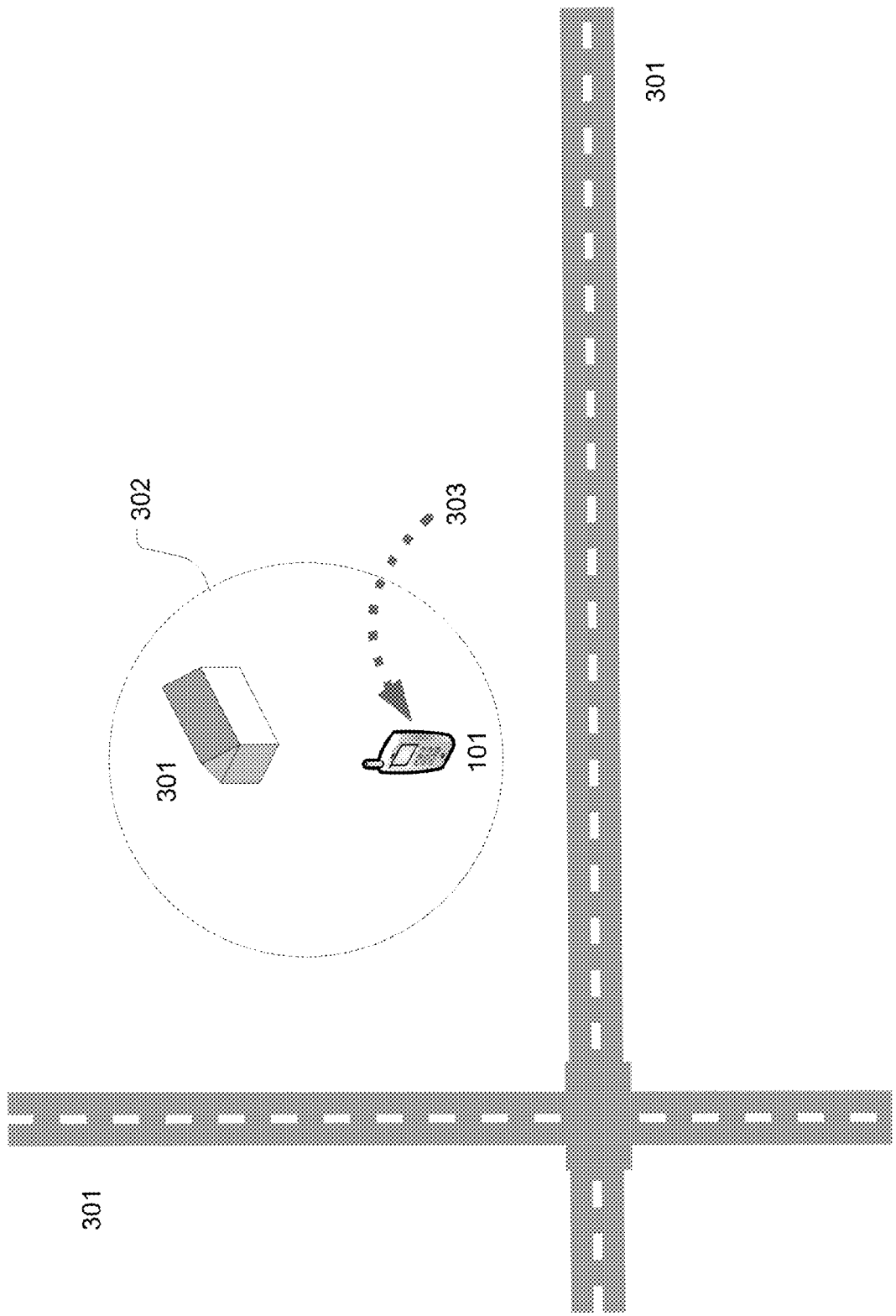
FIG. 3 geographically depicts the locator device entering a geo-fenced geographic area.

FIG. 3 illustrates an implementation of a geo-fenced boundary 302 which includes geographic entities 301 such as structures and roads. In this use case, the wireless location device 101 may cross the geo-fence boundary 302 from an initial position 303 outside the geo-fence boundary 302.

Figure 4:
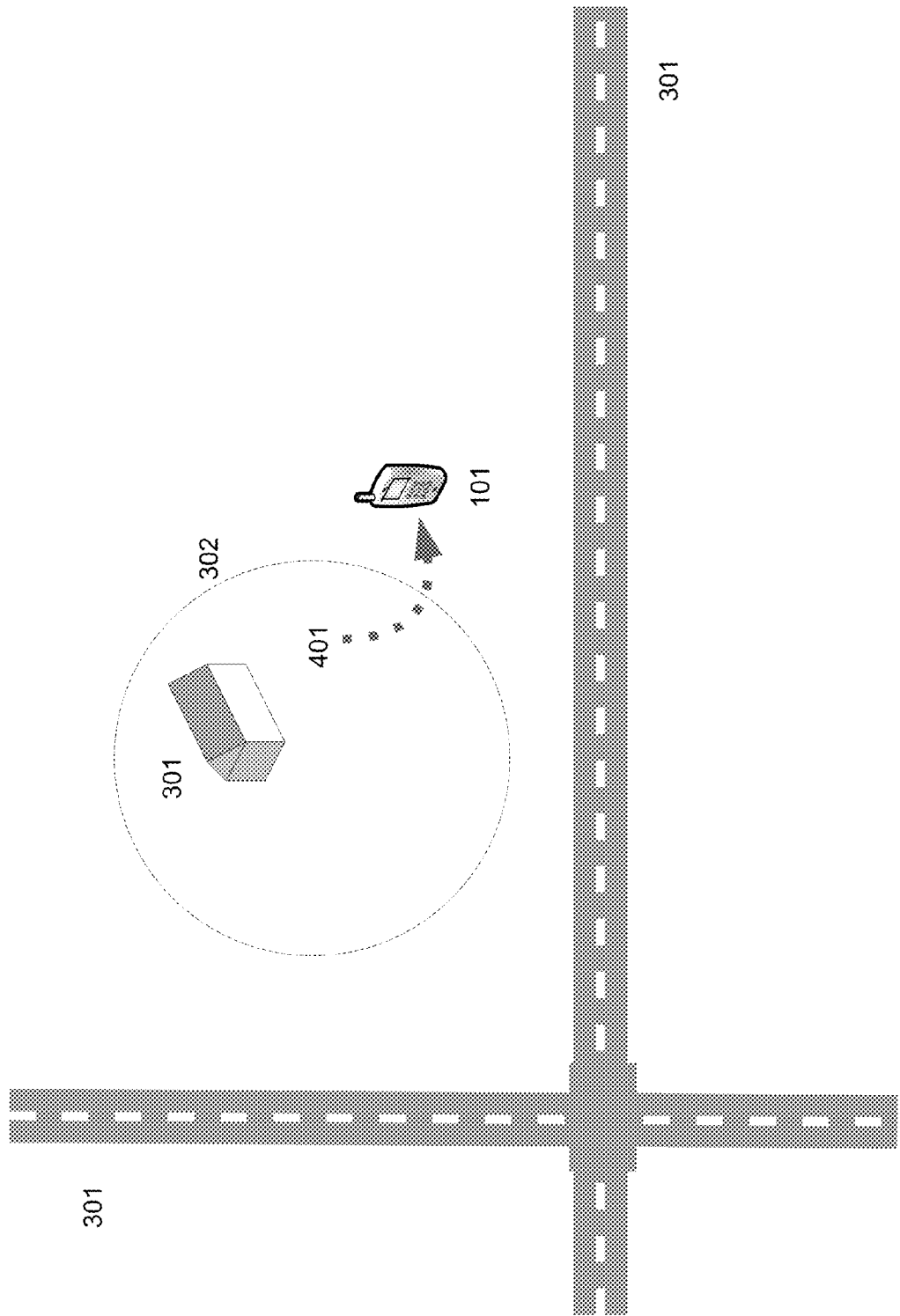
FIG. 4 geographically depicts the locator device leaving a geo-fenced geographic area.

FIG. 4 illustrates an implementation of a geo-fenced boundary 302 which includes geographic entities 301 such as structures and roads. In this use case, the wireless location device 101 crosses the geo-fence boundary 302 from an initial position 401 inside the geo-fence boundary 302.

Exiting the Geofence

Figure 5A:
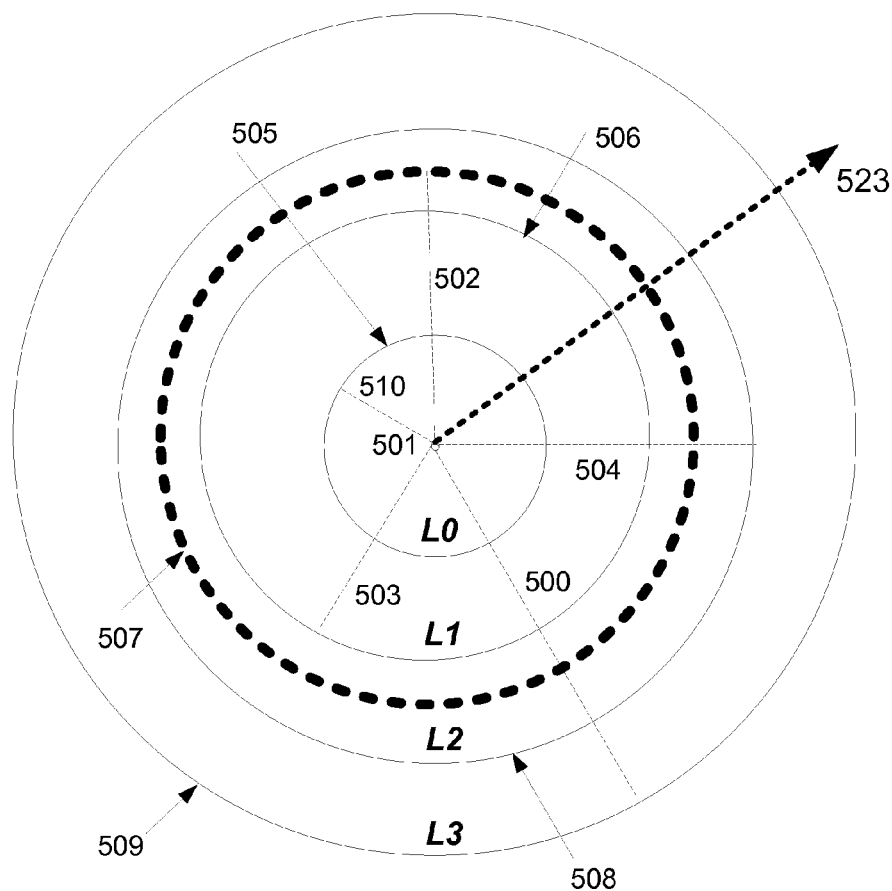
FIGS. 5*a* and 5*b* illustrate the confidence levels associated with a locator device exiting a circular and polygon geo-fenced geographic area, respectively.
Figure 5B:
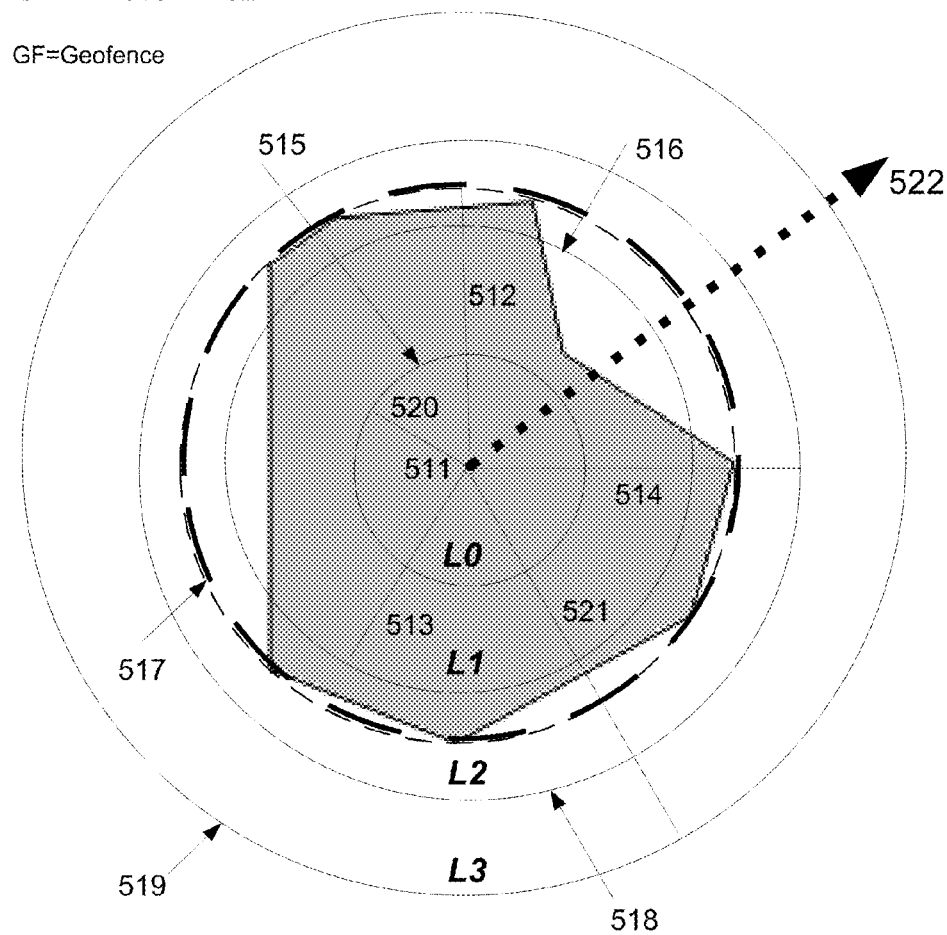

Referring now to FIG. 5a and FIG. 5b, illustrated are different confidence levels as they relate to the use case of a device exiting a geo-fence. In FIG. 5a, a circular geo-fence 507 has been defined around a central point 501, the geo-fence having radius 502. A confidence factor of Level 0 may be defined as an area within a circle 505 around the central point 501 with a radius 510. In FIG. 5a, the arrow 522 is shown to depict an example of a mobile device as it departs from the origin 501, crosses the geofenced boundary and leaves the area.

A confidence factor of Level 1 may be defined as the area within an annulus between the described level 0 circle 505 and a second circle 506 around the central point 501 with a radius 503. A confidence factor of Level 2 may be defined as the area within an annulus between the described level 1 circle 506 and a second circle 508 around the central point 501 with a radius 504. A confidence factor of Level 3 is assigned to all areas 509 around the central point 501 with a radius 500 and outside the Level 0, Level 1, and Level 2 areas.

Referring to FIG. 5b, a non-circular polygon 517 has been designated as the geo-fenced area. The center-of-mass of the geo-fenced area may be computed as 511 and the radius of the geo-fenced area's circular approximation has radius 512, corresponding to the maximum offset between the computed center of mass 511 and the furthest edge of the polygon. In FIG. 5b, the arrow 522 is shown to depict an example of a mobile device as it departs from the center-of-mass 511, crosses the geofenced boundary and leaves the area.

A confidence factor of Level 0 may be defined as an area within a circle 515 around the central point 511 with a radius 520. A confidence factor of Level 1 may be defined as the area within an annulus between the described level 0 circle 515 and a second circle 516 around the central point 511 with a radius 513. A confidence factor of Level 2 has been defined as the area within an annulus between the described level 1 circle 516 and a second circle 518 around the central point 511 with a radius 514. A confidence factor of Level 3 519 around the central point 511 with a radius 521 may be assigned to all areas outside the Level 0, Level 1, and Level 2 areas.

Entering the Geo-Fence

Figure 5C:
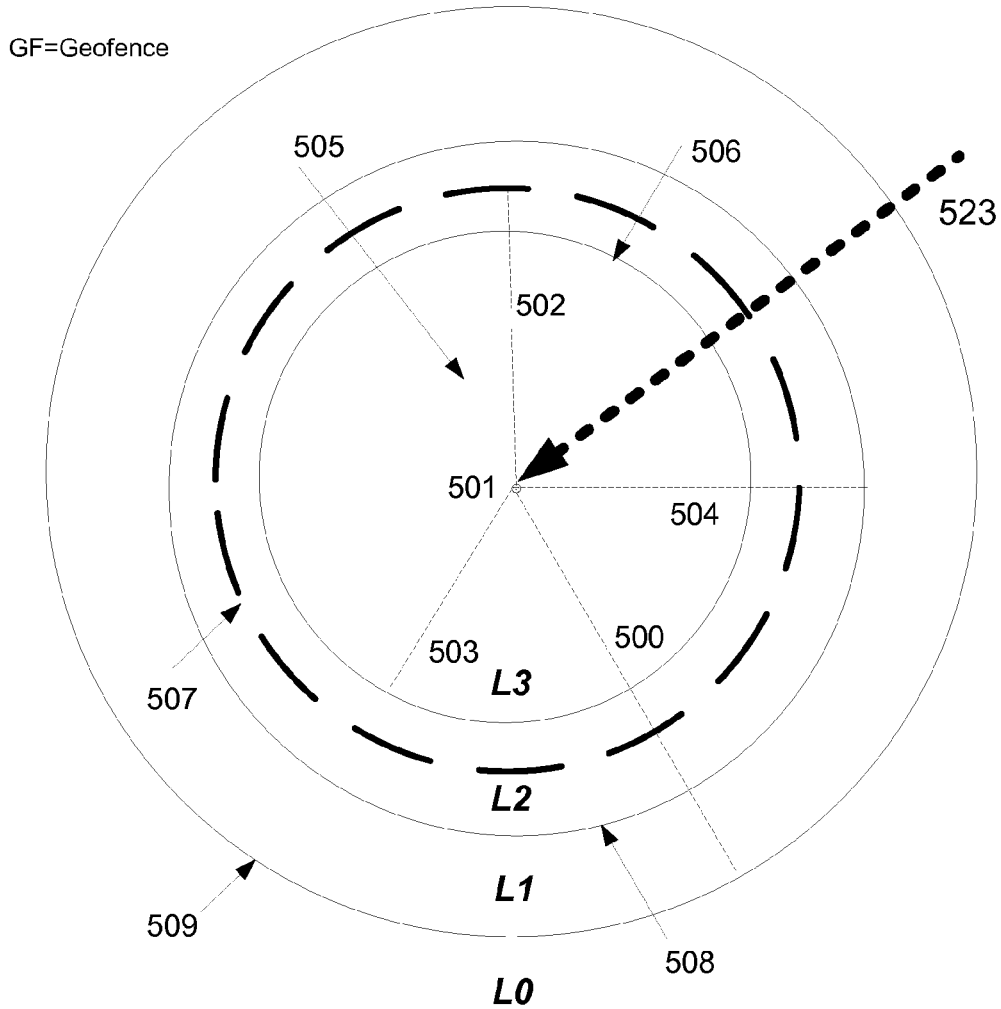
FIGS. 5*c* and 5*d* illustrate the confidence levels associated with a locator device entering a circular and polygon geo-fenced geographic area, respectively.
Figure 5D:
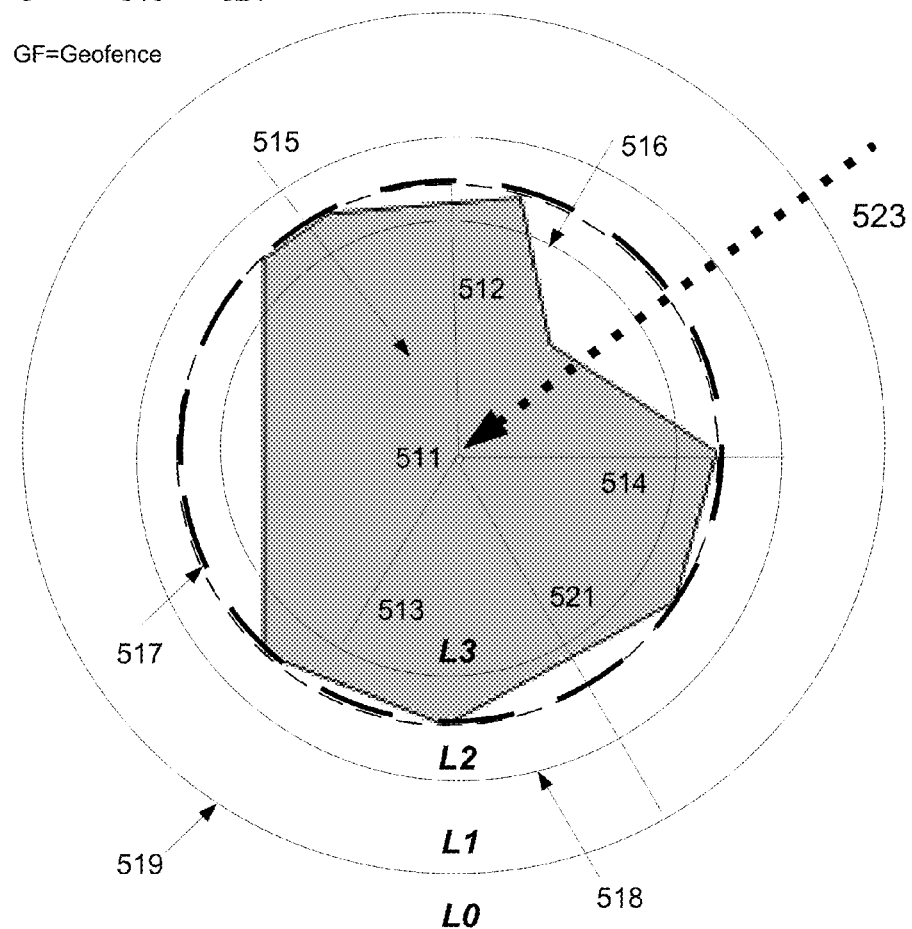

Referring now to FIG. 5c and FIG. 5d, illustrated are different confidence levels as they relate to the use case of a device entering a geo-fence. In FIG. 5c, a circular geo-fence 507 has been defined around a central point 501, the geo-fence having radius 502. A confidence factor of Level 0 may be defined as an area outside a circle 509 around the central point 501 with a radius 500. In FIG. 5c, the arrow 523 is shown to depict an example of a mobile device as it enters the area, crosses the geofenced boundary and arrives at the origin 501.

In FIG. 5c A confidence factor of Level 1 may be defined as the area inside an annulus between the described level 0 circle 509 and a second circle 508 around the central point 501 with a radius 504. A confidence factor of Level 2 may be defined as the area within an annulus between the described level 1 circle 508 and a second circle 506 around the central point 501 with a radius 503. A confidence factor of Level 3 is assigned to all areas 506 around the central point 501 with a radius 503 and inside the Level 0, Level 1, and Level 2 areas.

Referring to FIG. 5d, a non-circular polygon 517 has been designated as the geo-fenced area. The center-of-mass of the geo-fenced area may be computed as 511 and the radius of the geo-fenced area's circular approximation has radius 512, corresponding to the maximum offset between the computed center of mass 511 and the furthest edge of the polygon. In FIG. 5d, the arrow 523 is shown to depict an example of a mobile device as it enters the area, crosses the geofenced boundary and arrives at the center-of-mass 511.

In FIG. 5d confidence factor of Level 0 may be defined as an area within a circle 519 around the central point 511 with a radius 521. A confidence factor of Level 1 may be defined as the area within an annulus between the described level 0 circle 519 and a second circle 518 around the central point 511 with a radius 514. A confidence factor of Level 2 has been defined as the area within an annulus between the described level 1 circle 518 and a second circle 516 around the central point 511 with a radius 513. A confidence factor of Level 3 516 around the central point 511 with a radius 513 may be assigned to all areas inside the Level 0, Level 1, and Level 2 areas.

Those skilled in the art will appreciate that the methods and systems disclosed herein may be applied to any geo-fenced area represented by any number of shapes and sizes. Shapes that may be approximated by a circle may efficiently be represented by determining a center of mass and a best fit circle. In other embodiments, the presently disclosed methods may be applied to a geo-fenced area of any shape and size and an area of uncertainty of any shape and size. For example, a geo-fenced area may be rectangular while the area of uncertainty may be circular. In such a case the confidence levels may be determined as a function of the boundary of the rectangle and the circular area of uncertainty.

The following are a series of flowcharts depicting implementations of processes. FIGS. 6a through 6e depict an exemplary operational procedure for implementation of the border crossing detection algorithm. The algorithm depicted may increase the probability of detection of movement into or out of the geographically defined area while decreasing the probability of false positives while at the same time, minimizing the number of position fixes calculated and reported. For simplicity, in this illustrative example, the on-board location capabilities of the wireless location device 101 are limited to assisted GPS.

Figure 6A:
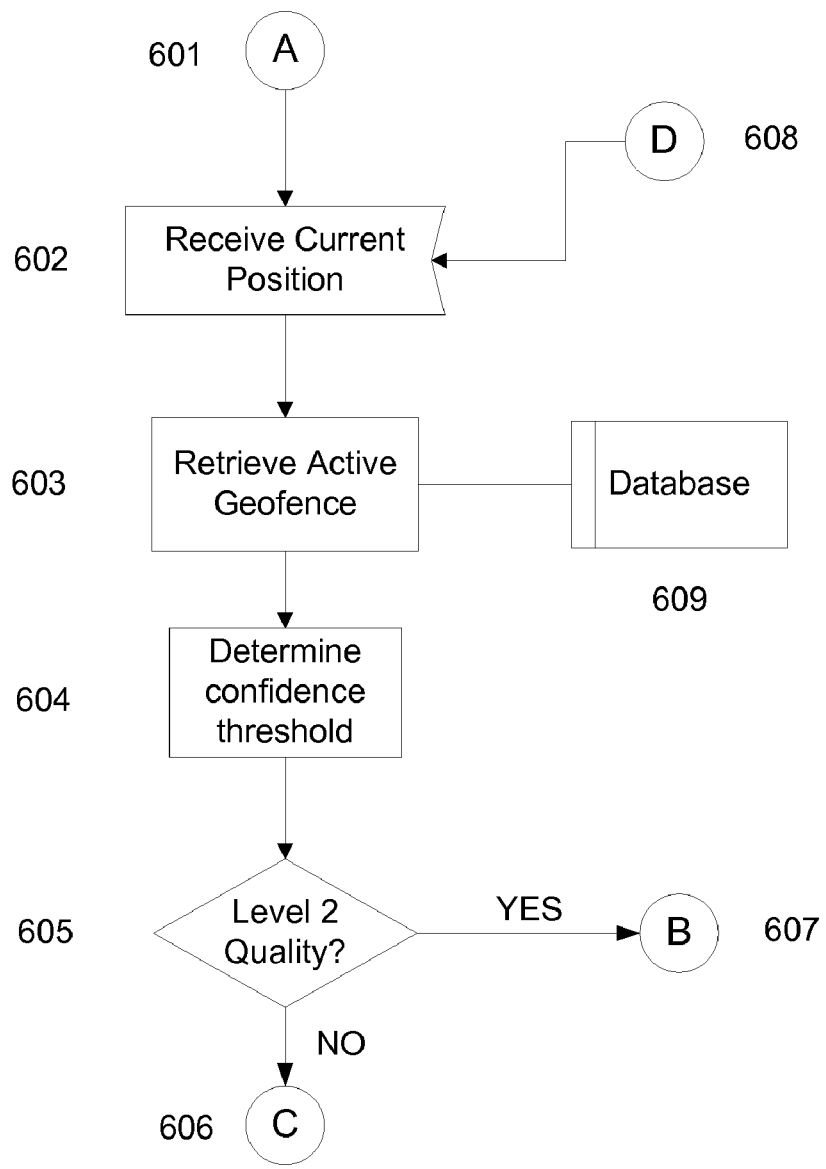
FIG. 6*a-e* describes graphically an implementation of an illustrative embodiment of the border crossing detection algorithm.

Referring to FIG. 6a, in process 601, the device application wake-up timer (local to the location device 101) expires, which wakes up the application. In process 602, the Application requests and receives the current position of the device from the GPS chipset (process 608). The GPS chipset receiver processes the GPS satellite signals, calculates the position, and returns the position to the Application. In process 603, the Application retrieves the pre-defined geo-fence configuration data from the local device database 609. In process 604, the Application executes the geo-fence algorithm and the algorithm determines whether the device's position is inside or outside the pre-configured geo-fence boundary and the associated confidence level as to whether the device has crossed the geo-fence boundary. In process 605, the Application determines whether the confidence level is equal to the level 2 confidence level value. If the calculated confidence level from process 605 is not equal to the level 2 confidence value, then the process turns to process 606. If the calculated confidence level from process 605 is equal to the level 2 confidence value, then the process turns to process 607.

Figure 6B:
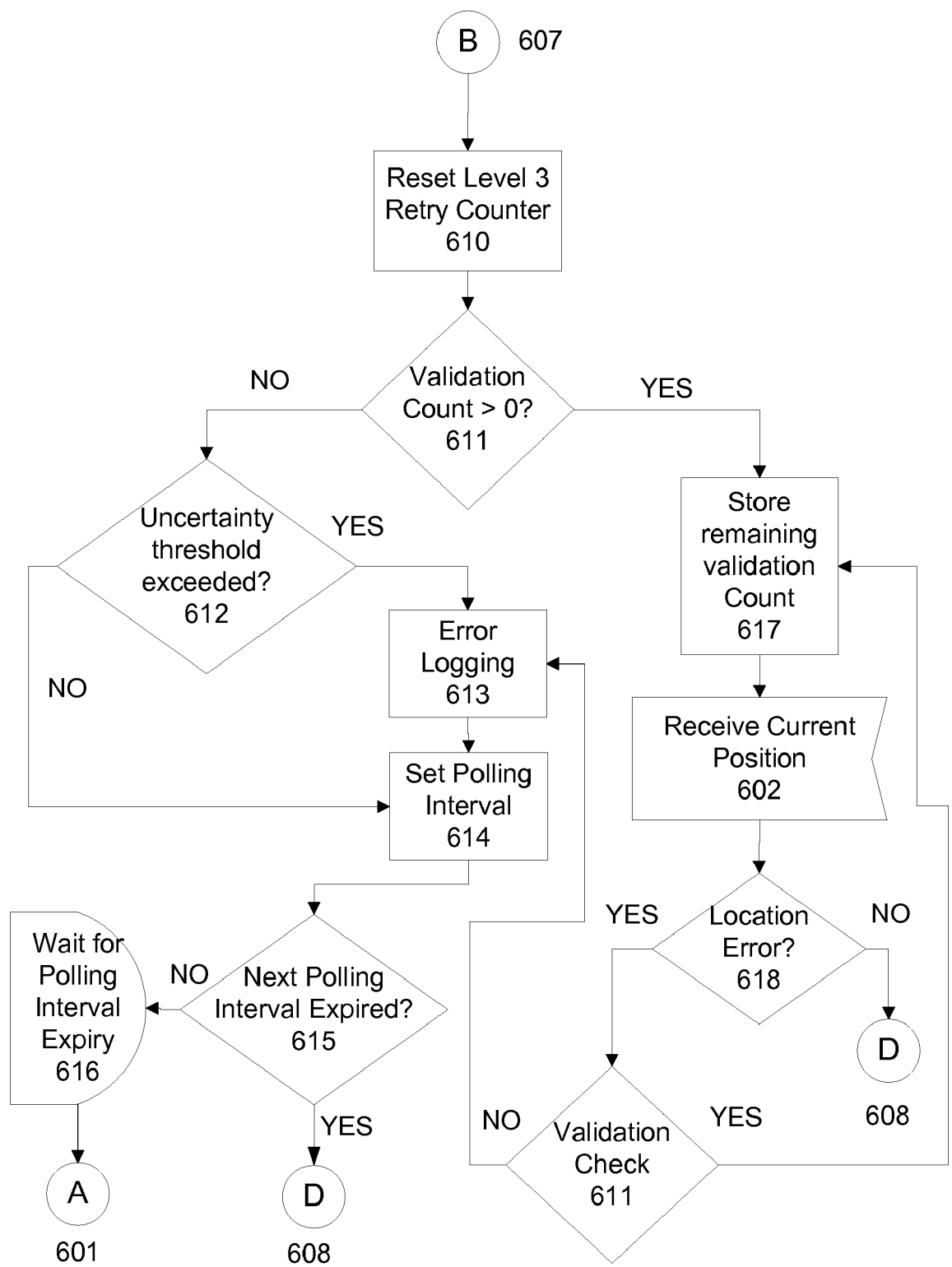

Turning now to FIG. 6b, in step 607, the calculated confidence value is equal to the level 2 confidence value, which results in a reset of the level 3 retry counter in process 610. At this point the Application performs a validation check in process 611. Due to the error uncertainty in the returned location, the device is in a "gray" area very close to the border of the geo-fence. Therefore, a state change is probable, but to minimize the probability of a false geo-fence boundary crossing alert/notification being sent to a user, the Application now requests additional position fixes from the device, based on the validation count, to increase the decision confidence. Because measurements in the level 2 decision process are in relation to the location uncertainty, a pre-configured location uncertainty upper limit is defined. If the returned location uncertainty is greater than the configured geo-fence radius, the calculated level 2 position fix may be erroneous and thus eliminated. The threshold is determined by the following calculation:

uncertaintyThreshold=horizontalUncertainty/geo-fenceRadius

The uncertainty threshold is expressed in terms of a percentage with a default value of 99%. The uncertainty threshold is exceeded if the returned uncertainty is equal to or greater than the geo-fence radius. If the uncertainty threshold is exceeded in process 612, the Application will log the error in process 613 and reset the polling interval in process 614. If the location uncertainty threshold is not exceeded, the polling interval is reset in process 614. If the polling interval timer expires, the process turns to process 608 to collect a new location estimate. If the polling interval has not expired wait for timer to expire and go to step 601. If after performing the validation check in process 611 the validation count is greater than 0, the process turns to process 617 and the Application decrements the validation count by 1 and stores the new validation count value. The process then turns to process 602, where the Application requests another position fix from the device and uses this position fix to determine the new state.

Figure 6C:
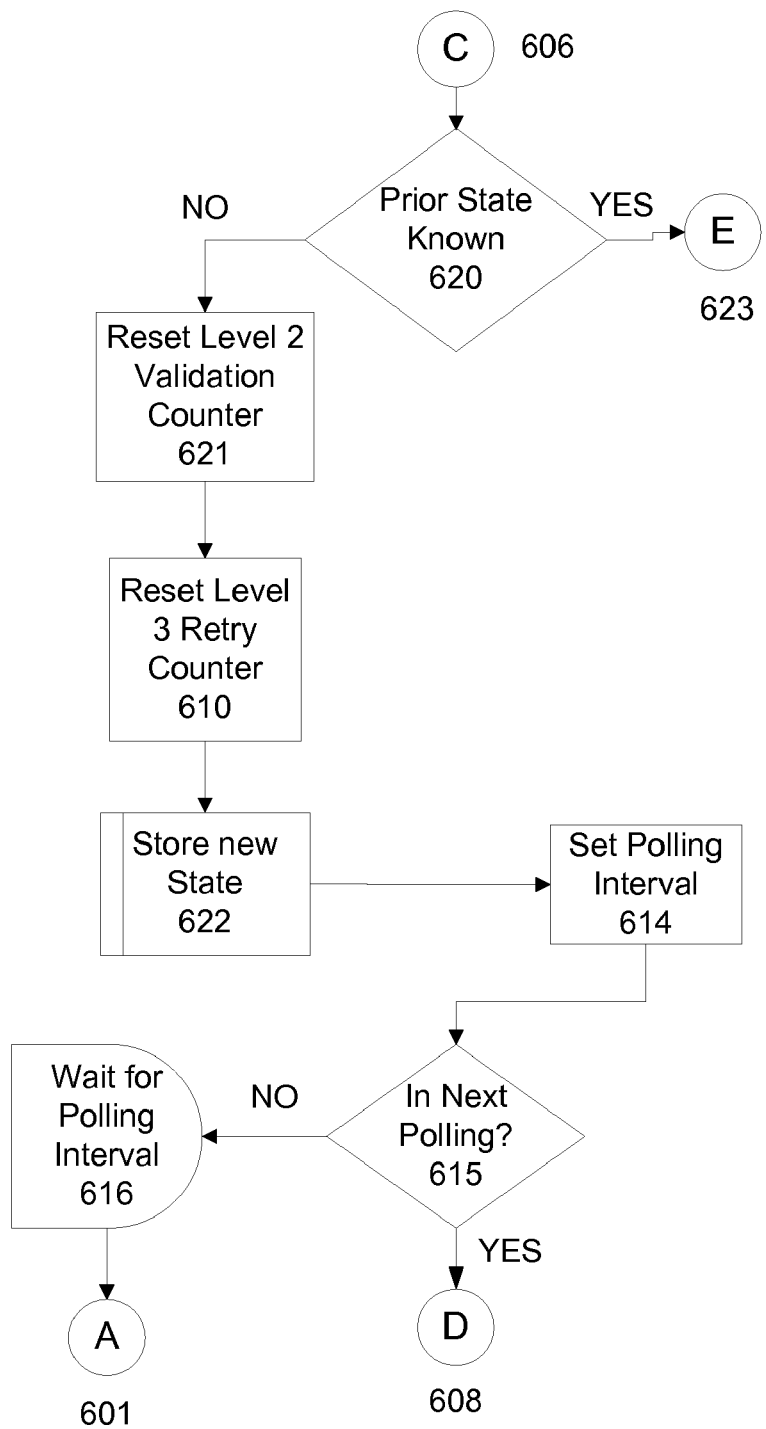

Turning now to FIG. 6c, in process 606, the device application logic may request a check of the prior state of the device position relative to the pre-configured geo-fence boundary. In process 620, the Application checks the prior state, which can be inside the geo-fence boundary, outside the geo-fence boundary, or unknown. If the prior state is unknown, then the process turns to process 621 and resets the level 2 validation counter. The process then turns to process 610 and resets the level 3 validation counter. The process then turns to process 622 and stores the new state. In process 614, the device has not yet crossed the threshold and therefore the state has not changed. If any other polling interval timers have expired, the process turns to process 608 to collect a location estimate. If no other polling interval timers have expired, then the process turns to process 616 where the device CPU and Application is commanded to go into sleep mode until a device interval timer expires and wakes up the Application, whereupon the process will return to process 601.

Figure 6D:
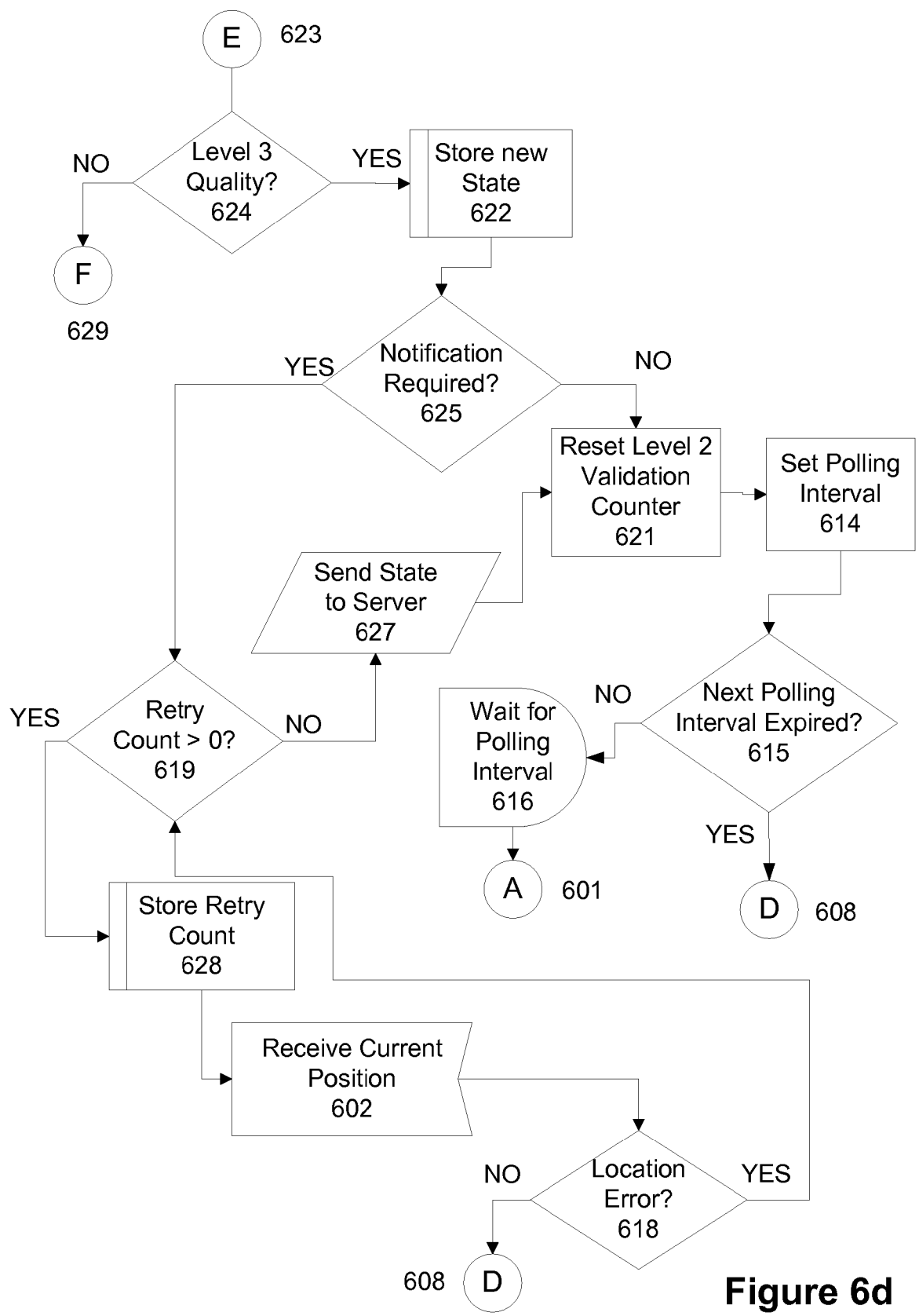

Turning now to FIG. 6d, after the Application wakes up and requests and receives a position fix from the device, if the calculated confidence level is not equal to level 3, the application turns to process 629. If the confidence level is equal to level 3, the process turns to process 622 where the new state is stored. In process 625 the user pre-configured notification configuration is checked to determine if the user has requested a notification when the device exits or enters the geozone boundary.

If notification is not required, operation turns to process 621 where the level 2 validation counter is reset. In process 614 the polling interval is set. Next, in process 615 it is determined whether the next polling interval timer has expired. If the next polling interval has not expired, the Application turns to process 616 and goes to sleep, waiting for the next polling interval timer to expire whereupon operation will turn to process 601. If the next polling interval has expired, the Application turns to process 608 to collect a location estimate.

If notification is required, operation turns to process 619 to check the position retry counter value. If the position retry counter value is equal to 0, the new state is sent to the server so that the server can send an "entry" or "exit" notification alert to the user via an SMS and/or Email delivery mechanism. If the position retry counter value is greater than 0, then operation turns to process 628 where the position retry counter is stored. In process 602, the Application requests and receives a new position fix. If there is an error in obtaining the position fix, operation turns to process 6219 If a successful position fix is returned, the Application goes to sleep and waits for the next sleep timer to expire to wake up the Application.

Figure 6E:
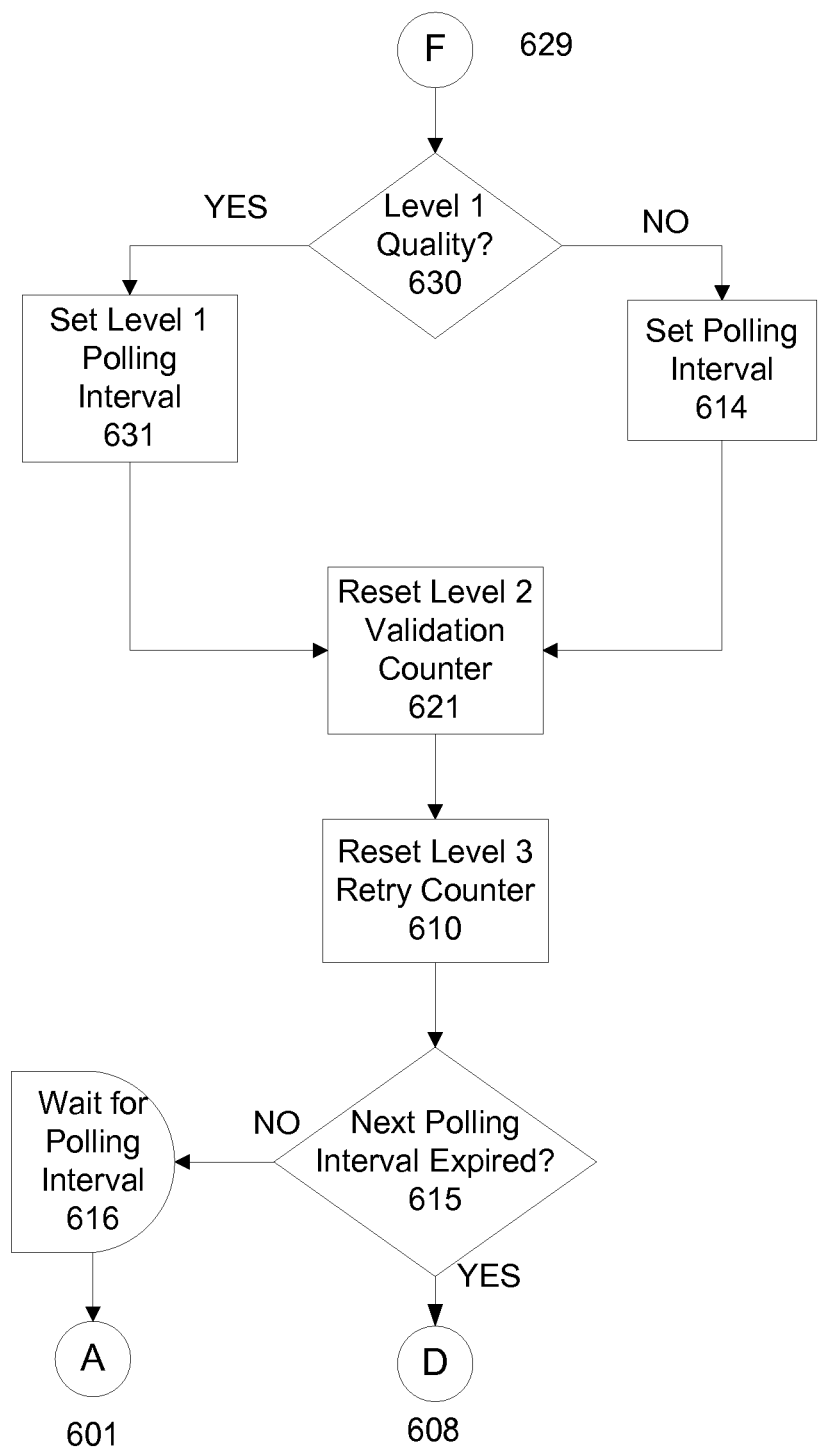

Turning now to FIG. 6e, in process 630, the Application checks the confidence level. If the confidence level equals level 1, the state has not changed, but the device is approaching the geozone boundary. Operation turns to process 631, where the device is approaching the geo-fence boundary, taking into account the returned error uncertainty. However, because of the length of the default polling interval may be long, the Application may now reset the polling interval to ½ the previous default polling interval value. By decreasing the polling interval value, the device position is checked more frequently, thus reducing the notification time to the user if the device crosses the geo-fence boundary without changing the state. If the confidence level is not equal to level 1, the operation turns to process 614 and the default polling interval may be reset.

Operation then turns to process 621 and the level 2 validation counter is reset. In process 610 the level 3 position fix retry counter is reset. Next, operation turns to process 615 where it is determined whether the next polling interval timer has expired. If the next polling interval has not expired, the Application turns to process 616, goes to sleep, and waits for the next polling interval timer to expire whereupon operation will turn to process 601. If the next polling interval has expired, the Application turns to process 608 to collect a location estimate.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

The scope of the present disclosure is not limited to the presently disclosed embodiments. For example, the foregoing disclosure of a mobile locator device, landside services network, and geo-fencing algorithm are merely exemplary and should not be construed so as to limit the scope of the following claims. In many cases, the particular implementation (i.e., the functional elements) described herein is merely a designer's preference. While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method of tracking movement of a wireless location device relative to a predefined geographic boundary, comprising:
   receiving a position fix and error data defining an error zone around the position fix;
   determining a distance between the position fix and a zone boundary edge;
   determining a zone alert confidence threshold as a function of the distance between the position fix and the zone boundary edge, the geographic boundary circle radius, and the error data;
   determining that the zone alert confidence threshold meets a predefined level; and
   providing notification that the device has crossed the predefined geographical boundary.

2. The method of claim 1, wherein said predefined level comprises at least a first level indicating that the device has crossed the predefined geographical boundary, a second level indicating that the device may have crossed the predefined geographical boundary, a third level indicating that the device is in proximity to but has not crossed the predefined geographical boundary, or a fourth level indicating that the device has not crossed the predefined geographical boundary.

3. The method of claim 2, further comprising notifying a location server of a state change when said confidence threshold is at the first level.

4. The method of claim 3, further comprising notifying a location server of a state change when said confidence threshold is at the third level.

5. The method of claim 3, wherein the location server is notified only when a user configuration indicates that the location server should be notified, further comprising storing the state when a previous level is unknown.

6. The method of claim 2, further comprising determining a device location based on two consecutive location fixes when the zone alert confidence threshold is at the second level.

7. The method of claim 2, further comprising determining a need for notification upon exit from a geo-fenced area based on two consecutive location fixes when the confidence threshold is at the third level.

8. The method of claim 2, wherein said determining a zone alert confidence threshold is performed according to a polling interval.

9. The method of claim 8, further comprising decreasing the polling interval when the confidence threshold transitions to level 1.

10. The method of claim 8, further comprising increasing the polling interval when the confidence threshold transitions from level 1 to any other level.

11. The method of claim 8, further comprising using a predetermined polling interval.

12. The method of claim 1, further comprising:
    determining a location uncertainty upper limit as a ratio of a horizontal uncertainty and the geographic boundary circle radius; and
    discarding a position fix when the location uncertainty upper limit meets a predetermined level.

13. The method of claim 1, wherein said determining a zone alert confidence threshold is performed according to a zone alert schedule, the schedule comprising a range of dates and times for determining when the device has entered or exited the predefined geographic boundary.

14. The method of claim 1, wherein said position fix comprises a latitude, a longitude, and an error uncertainty ellipse comprising a major axis radius and minor axis radius.

15. The method of claim 1, wherein said wireless location device implements at least one of GPS, U-TDOA, E-OTD, or ECID positioning technologies.

16. A method of tracking movement of a wireless location device relative to a predefined geographic boundary, comprising:
    receiving indication that the wireless location device has crossed the predefined geographical boundary;
    receiving from the device at least two consecutive measurements of positioning data and associated positioning data accuracies;
    determining that the positioning data accuracies meet a predefined level; and
    providing notification that the device has crossed the predefined geographical boundary when the positioning data accuracies meet the predefined level.

17. A computing system adapted to track movement of a wireless location device relative to a predefined geographical boundary, comprising:
    a server; and computing memory communicatively coupled to said server, the computing memory having stored therein a software application adapted to perform the following:
- define a two dimensional geographic zone area corresponding to said predefined geographical boundary;
- implement a timer for periodically commanding at least one positioning wireless location device to wake up from a sleep mode;
- request a position fix from said at least one wireless location device when the device reports an accuracy that meets an accuracy threshold; and
- wirelessly send an alert when the device has crossed the predefined geographical boundary.

18. The system of claim 17, further adapted to send to said at least one wireless location device a text message comprising at least one instruction command instructing the device to:
- establish a wireless data session with the server;
- request specific data from the server related to the at least one instruction command, and
- process and store the received specific data on the device.

19. The system of claim 17, further adapted to receive a position fix log from the at least one positioning wireless location device and transmit contents of said position fix log to a web server for retrieval by a user.

20. A wireless location determination device for tracking movement relative to a predefined geographic boundary, the device configured to:
- periodically request a position fix and associated position fix error based on a predetermined timer value; and
- transmit an alert via a wireless network when the device has crossed the predefined geographic boundary.

21. The device of claim 20, further configured to detach from the wireless network, power off at least one device module, and terminate at least one software process based on predefined software logic.

22. The device of claim 20, further configured to:
- store position fixes on the device;
- periodically establish a wireless data session with a server and send the stored position fixes to the server.

* * * * *